(12) United States Patent
Siskind et al.

(10) Patent No.: US 12,131,537 B2
(45) Date of Patent: Oct. 29, 2024

(54) SYSTEM AND METHOD FOR SENTENCE DIRECTED VIDEO OBJECT CODETECTION

(71) Applicant: Purdue Research Foundation, West Lafayette, IN (US)

(72) Inventors: Jeffrey Mark Siskind, West Lafayette, IN (US); Haonan Yu, Sunnyval, CA (US)

( * ) Notice: Subject to any disclaimer, the term of this patent is extended or adjusted under 35 U.S.C. 154(b) by 271 days.

(21) Appl. No.: 17/135,995

(22) Filed: Dec. 29, 2020

(65) Prior Publication Data
US 2022/0207272 A1 Jun. 30, 2022
US 2023/0410504 A9 Dec. 21, 2023

Related U.S. Application Data

(63) Continuation of application No. 16/323,179, filed as application No. PCT/US2017/036232 on Jun. 6, 2017, now abandoned.

(60) Provisional application No. 62/346,459, filed on Jun. 6, 2016.

(51) Int. Cl.
| | |
|---|---|
| G06V 20/40 | (2022.01) |
| G06F 18/20 | (2023.01) |
| G06F 18/22 | (2023.01) |
| G06T 7/20 | (2017.01) |
| G06T 7/73 | (2017.01) |

(52) U.S. Cl.
CPC ............. *G06V 20/41* (2022.01); *G06F 18/22* (2023.01); *G06F 18/29* (2023.01); *G06T 7/20* (2013.01); *G06T 7/73* (2017.01); *G06T 2207/10016* (2013.01); *G06T 2207/10024* (2013.01)

(58) Field of Classification Search
CPC ... G06T 7/70; G06T 7/20; G06T 2207/10016; G06T 2207/10024; G06K 9/6296; G06K 9/6215; G06K 9/00718; G06K 9/726; G06K 9/00751; G06K 2009/00738
USPC ........................................................ 382/103
See application file for complete search history.

(56) References Cited

U.S. PATENT DOCUMENTS

| | | | | |
|---|---|---|---|---|
| 7,027,974 B1 * | 4/2006 | Busch | ................... | G06F 40/284 704/4 |
| 8,548,231 B2 * | 10/2013 | Shet | ...................... | G06K 9/626 706/56 |
| 9,183,466 B2 * | 11/2015 | Siskind | .................. | G06V 20/52 |

(Continued)

OTHER PUBLICATIONS

Haonan Ye et al., Sentence Directed Video Object Codetection, arXiv.org, Cornell University Library, Jun. 5, 2015. (Year: 2015).*

(Continued)

*Primary Examiner* — Ishrat I Sherali

(57) ABSTRACT

A system and method for determining the locations and types of objects in a plurality of videos. The method comprises pairing each video with one or more sentences describing the activity or activities in which those objects participate in the associated video, wherein no use is made of a pretrained object detector. The object locations are specified as rectangles, the object types are specified as nouns, and sentences describe the relative positions and motions of the objects in the videos referred to by the nouns in the sentences. The relative positions and motions of the objects in the video are described by a conjunction of predicates constructed to represent the activity described by the sentences associated with the videos.

17 Claims, 4 Drawing Sheets

(56) References Cited

U.S. PATENT DOCUMENTS

| | | | | |
|---|---|---|---|---|
| 10,768,769 | B2* | 9/2020 | Choe | A63F 13/795 |
| 11,017,556 | B2* | 5/2021 | Yang | G06T 7/74 |
| 2011/0243377 | A1* | 10/2011 | Casamona | G06T 7/20 |
| | | | | 382/103 |
| 2014/0342321 | A1* | 11/2014 | Wendt | G09B 7/06 |
| | | | | 434/156 |
| 2014/0369596 | A1* | 12/2014 | Siskind | G06F 16/7837 |
| | | | | 382/158 |
| 2015/0294158 | A1* | 10/2015 | Collins | G06V 10/40 |
| | | | | 382/103 |

OTHER PUBLICATIONS

Yu et al., A Faster Method for Tacking and Scoring Videos Corresponding to Sentences, arXiv: 1411.4064v1 [cs.CV], Nov. 14, 2014 (Year: 2014).*

Achanta, R et al., "SLIC Superpixels", EPFL Techical Report 149300, Jun. 2010, (15 pages).

Alexe, B. et al., "What is an object ?", Computer Vision Laboratory, ETH Zurich, {Bogdan, Deselaers, Ferrari} @ vision.ee.ethz.ch, (8 pages).

Andres, B. et al., "OpenGM: A C++ Library for Discrete Graphical Models", HCI, University of Heidelberg, http://hci.iwr.uni-heidelberg.de/opengm2, Jun. 1, 2012, (5 pages).

Barbu, A et al., "Video in Sentences Out", Corresponding Author, Email: andrei@0xab.com., Additional Images and Videos as Well as All Code and Datasets are Available at http://engineering.purdue.edu/~qobi/arxiv2012b, (13 pages).

Berg, T.L. et al., "Names and Faces", University of California, Berkeley, Department of Computer Science, Berkeley, CA 94720, (30 pages).

Blaschko, M.B. et al., "Simultaneous Object Detection and Ranking with Weak Supervision", Department of Engineering Science, University of Oxford, United Kingdom, (9 pages).

Bojanowski, P. et al., "Weakly-Supervised Alignment of VideoWith Text", arXiv: 1505.06027v2 [cs.CV] Dec. 21, 2015, (9 pages).

Bosch, A. et al., "Image Classification using Random Forests and Ferns", Partially Funded by the University of Girona, Grant No. BR03/01, by EU Project CLASS, and by a MURI Grant. (8 pages).

Bradski, G.R., "Computer Vision Face Tracking for Use in a Perceptual User Interface", Intel Technology Journal, Q2 (1998), (15 pages).

Cheng, M-M., et al., "BING: Binarized Normed Gradients for Objectness Estimation at 300fps", https://www.researchgate.net/publication/286404956, Article—Sep. 2014, DOI:10.1109/CVPR.2014.414, (9 pages).

Cinbis, R.G. et al., "Weakly Supervised Object Localization with Multi-fold Multiple Instance Learning", arXiv:150300949v2 [cs.CV] Sep. 2, 2015, (15 pages).

Clarke, J. et al., "Driving Semantic Parsing from the World's Response", Department of Computer Science, University of Illinois, Urbana, IL, {clarkeje,goldwas1,mchang21,danr}@illinois.edu., (10 pages).

Dalal, N. et al., "Histograms of Oriented Gradients for Human Detection", Proceedings of the 2005 IEEE Computer Society Conference on Computer Vision and Pattern Recognition (CVPR'05), (8 pages).

Das, P. et al., "A Thousand Frames in Just a FewWords: Lingual Description of Videos through Latent Topics and Sparse Object Stitching", Computer Science and Engineering, SUNY at Buffalo; {pdas3,chenlian, rfdoell,jcorso}@buffalo.edu, (8 pages).

Elman, J.L., "Finding Structure In Time", Cognitive Science, 14, (1990), pp. 179-211.

Farneback, G., "Two-Frame Motion Estimation Based on Polynomial Expansion", Computer Vision Laboratory, Link oping University, SE-581 83 Linkoping, Sweden, gf@isy.liu.se; http://www.isy.liu.se/cvl/, (8 pages).

Girschick, R., "Fast R-CNN", Microsoft Research—rbg@microsoft.com; arXiv: 1504.08083v2 [cs.CV] Sep. 27, 2015, (9 pages).

Graves, A. et al., "Neural Turing Machines", Google DeepMind, London, UK., arXiv:1410.5401v2, [cs.NE] Dec. 10, 2014, (26 pages).

Guadarrama, S. et al., "YouTube2Text: Recognizing and Describing Arbitrary Activities Using Semantic Hierarchies and Zero-shot Recognition", This ICCV (2013) Paper is the Open Access Version, Provided by the Computer Vision Foundation; The Authoritative Version of This Paper is Available in IEEE Xplore; pp. 2712-2719.

Gupta, A. et al., "Beyond Nouns: Exploiting Prepositions and Comparative Adjectives for Learning Visual Classifiers", Department of Computer Science, University of Maryland, College Park; (agupta,lsd)@cs.umd.edu; (14 pages).

Frank, M. et al., "An Algorithm For Quadratic Programming", Downloaded from https://onlinelibrary.wiley.com/doi/10.1002/nav.38000301109 by Purdue University (West Lafayette), Wiley Online Library; (pp. 95-110).

Hochreiter, S. et al., "Long Short-Term Memory", Neutral Computation 9 (8), (1997), (pp. 1735-1780).

International Search Report and Written Opinion for International Application No. PCT/US2017/036232, dated Aug. 11, 2017, (4 pages).

Jamieson, M. et al., "Discovering Multipart Appearance Models from Captioned Images", University of Toronto, {jamieson,yulia, afsaneh, suzanne, sven}-@cs.toronto.edu; (14 pages).

Jamieson, M. et al., "Using Language to Learn Structured Appearance Models for Image Annotation", IEEE Transactions on Pattern Analysis and Machine Intelligence, vol. V, No. N, Month YYYY, (15 pages).

Jiang, M. et al., "SALICON: Saliency in Context", Department of Electrical and Computer Engineering, National University of Singapore; 978-1-4673-6964-0/15 (2015) IEEE Xplore, (pp. 1072-1080).

Joulin, A. et al., "Efficient Image and Video Co-localization with Frank-Wolfe Algorithm", Computer Science Department, Stanford University, D. Fleet et al. (Eds.): ECCV (2014), Part VI, LNCS 8694, (pp. 253-268).

Kong, C. et al., "What Are You Talking About? Text-to-Image Coreference", CVF This CVPR2014 Paper is the Open Access Version, Provided by the Computer Vision Foundation. The Authoritative Version of this Paper is available in IEEE Explore; (8 pages).

Koppula, HS. et al., "Learning Human Activities and Object Affordances from RGB-D Videos", Department of Computer Science, Cornell University, USA., arXiv:1210.1207v2 [cs.RO] May 6, 2013, (18 pages).

Kuehne, H. et al., "HMDB: A Large Video Database for Human Motion Recognition", (pp. 1-8).

Kummerer, M. et al., "Saliency Benchmarking Made Easy: Separating Models, Maps and Metrics [ECCV 2018]13 MIT/Tuebingen Saliency Benchmark", (2 pages).

Kwak, S. et al., "Unsupervised Object Discovery and Tracking in Video Collections", CVF This ICCV Paper is the Open Access Version, Provided by the Computer Vision Foundation, Except for this Watermark, it is Identical to the Version Available on IEEE Xplore; (pp. 3173-3181).

Lee, Y.J. et al., "Learning the Easy Things First: Self-Paced Visual Category Discovery", Proceedings of the IEEE Conference on Computer Version and Pattern Recognition (CVPR), (2011), (pp. 1721-1728).

Lin, D. et al., "Visual Semantic Search: Retrieving Videos via Complex Textual Queries", dhlin@ttic.edu., kc10@mails.tsinghua.edu.cn, {fidler,urtasun}@cs.toronto.edu., (8 pages).

Lowe, D.G., "Distinctive Image Features from Scale-Invariant Keypoints", International Journal of Computer Vision, (2004); (pp. 1-28).

Luo, J. et al., "Who's Doing What: Joint Modeling of Names and Verbs for Simultaneous Face and Pose Annotation", https://researchgate.net/publication/41386806 (2009), (10 pages).

Mao, J. et al., "Generation and Comprehension of Unambiguous Object Descriptions", arXiv:1511.02283v3 [cs.CV] Apr. 11, 2016; (11 pages).

Marszalek, M. et al., "Actions in Context", 978-1-4244-3991-1/09 (2009) IEEE Xplore, (pp. 2929-2936).

(56) References Cited

OTHER PUBLICATIONS

Palmer, M. et al., "The Proposition Bank: An Annotated Corpus of Semantic Roles", Computational Linguistics; Department of Computer and Information Science, University of Pennsylvania; email: mpalmer@cis.upenn, edu., (33 pages).

Pearl, J. Reverend Bayes on Inference Engines: A Distributed Hierarchical Approach (*)( ** ); AAAI-82: Proceedings of the National Conference on Artificial Intelligence, AAAI, (1982), (pp. 133-136).

Plummer, B.A. et al., "Flickr30k Entities: Collecting Region-to-Phrase Correspondences for Richer Image-to-Sentence Models", arXiv:1505.04870v4 [cs.CV] Sep. 19, 2016; (22 pages).

Pont-Tuset, J. et al., "Multiscale Combinatorial Grouping for Image Segmentation and Object Proposal Generation", arXiv.1503.00848v4 [cs.CV] Mar. 1, 2016; (14 pages).

Prest, A. et al., "Learning Object Class Detectors from Weakly Annotated Video", Weekly Annotated Video. Computer Vision and Pattern Recognition, IEEE, Jun. 2012, Providence, RI, United States. hal-00695940v1; ( 9 pages).

Ramanathan, V. et al., "Linking People in Videos with "Their" Names Using Coreference Resolution (Supplementary Material)", Department of Electrical Engineering, Stanford University Computer Science Department, Stanford University; (5 pages).

Rodriguez, M.D. et al., "Action MACH—A Spatio-temporal Maximum Average Correlation Height Filter for Action Recognition", Computer Vision Lab, University of Central Florida, Orlando, Florida; Military College of Signals; 978-1-4244-2243-2/08 (2008) IEEE, (8 pages).

Rohrbach, A. et al., "A Dataset for Movie Description", arXiv:1501.02530v1 [cs.CV], Jan. 12, 2015, (11 pages).

Rohrbach, M. et al., "A Database for Fine Grained Activity Detection of Cooking Activities", Proc. of the IEEE Conf. on Computer Vision and Pattern Recognition (CVPR), Providence, Rhode Island Jun. 2012 (8 pages).

Rubinstein, M. et al., "Unsupervised Joint Object Discovery and Segmentation in Internet Images", MIT CSAIL; INRIA; Microsoft Research; (8 pages).

Russakovsky, O. et al., "ImageNet Large Scale Visual Recognition Challenge", arXiv:1409.0575v3 [cs. CV] Jan. 30, 2015; (43 pages).

Schulter, S. et al., "Unsupervised Object Discovery and Segmentation in Videos", FFG Projects Human Factors Technologies and Services (2371236) and Mobile Traffic Checker (8258408); (2013) (pp. 1-12).

Senina, A. et al., "Coherent Multi-Sentence Video Description with Variable Level of Detail", arXiv:1403.6173v1 [cs.CV] May 24, 2014; (pp. 1-10).

Sigurdsson, G.A. et al., "Hollywood in Homes: Crowdsourcing Data Collection for Activity Understanding", arXiv:1604.01753v3 [cs. CV] Jul. 26, 2016; http://allenai.org/plato/charades; (pp. 1-17).

Simonyan, K. et al., "Very Deep Convolutional Networks for Large-Scale Image Recognition", arXiv:1409.1556v6 [cs. CV] Apr. 10, 2015; {karen, az}@robots.ox.ac.uk; (pp. 1-14).

Socher, R. et al., "Parsing with Compositional Vector Grammars", Proceedings of the 51st Annual Meeting of the Association for Computational Linguistics, Sofia Bulgaria (2013) (pp. 455,465).

Srikantha, A. et al., "Discovering Object Classes from Activities", D. Fleet et al. (Eds.): ECCV (2014), Part VI, LNCS 8694, Springer International Publishing Switzerland (2014); (pp. 415-430).

Srikantha, A. et al., "Weak Supervision for Detecting Object Classes from Activities", Computer Vision and Image Understanding, 156 (2017) (pp. 138-150).

Tang, K. et al., "Co-localization in Real-World Images", CVF This CVPR2014 Paper is the Open Access Version, Provided by the Computer Vision Foundation; The Authoritative Version of this Paper is Available in IEEE Explore; (8 pages).

Torabi, A. et al., "Using Descriptive Video Services to Create a Large Data Source for Video Annotation Research", arXiv:1503.01070v1 [cs.CV] Mar. 3, 2015, (7 pages).

Tuytelaars, T. et al., "Unsupervised Object Discovery: A Comparison", Article Published Online with Open Access at Springerlink.com (2009), (19 pages).

Venugopalan, S. et al., "Translating Videos to Natural Language Using Deep Recurrent Neural Networks", arXiv:1412.4729v3 [cs.CV] Apr. 30, 2015; (11 pages).

Wang, L. et al., "Video Object Discovery and Co-segmentation with ExtremelyWeak Supervision", In: ECCV (2014), (2-pages).

Wong, YW et al., "Learning Synchronous Grammars for Semantic Parsing with Lambda Calculus", Proceedings of the 45th Annual Meeting of the Association of Computational Linguistics, Prague, Czech Republic, (2007), (pp. 960-967).

Xiao, F. et al., "Track and Segment: An Iterative Unsupervised Approach for Video Object Proposals", CVF This paper is the Open Access Version, Provided by the Computer Vision Foundation; IEEE Xplore, (pp. 933-942).

Yu, H. et al., "A Compositional Framework for Grounding Language Inference, Generation, and Acquisition in Video", Journal of Artificial Intelligence Research 52 (2015), (pp. 601-713).

Yu, H. et al., "Sentence Directed Video Object Codiscovery", Springer, Int J Comput Vis; 124 (2017); (pp. 312-334).

Yu, H. et al., "Video Paragraph Captioning Using Hierarchical Recurrent Neural Networks", https:/www.researchgatae.net/publication/283335531; (2015); arXiv:1510.07712v2 [cs.CV] Apr. 6, 2016; (11 pages).

Zhu, Y. et al., "Aligning Books and Movies: Towards Story-like Visual Explanations by Watching Movies and Reading Books", arXiv:1506.06724v1 [cs.CV] Jun. 22, 2015; (23 pages).

Zitnick, C.L. et al., "Edge Boxes: Locating Object Proposals from Edges", Springer International Publishing Switzerland; D. Fleet et al., (Eds.): ECCV (2014), Part V, LNCS 8693, (pp. 391-405).

* cited by examiner

Input

The man removed the violet cabbage from the bowl.

The person carried the squash to the left, away from the yellow bowl.

The person is placing the mouthwash next to the cabbage in the sink.

Output

SYSTEM AND METHOD FOR SENTENCE DIRECTED VIDEO OBJECT CODETECTION

CROSS REFERENCE TO RELATED APPLICATIONS

The present U.S. patent application is a continuation of U.S. patent application Ser. No. 16/323,179, filed Feb. 4, 2019, which is a 35 U.S.C. § 371 national phase application of PCT/US17/36232, filed Jun. 6, 2017, which is related to and claims the priority benefit of U.S. Provisional Patent Application Ser. No. 62/346,459, filed Jun. 6, 2016, the contents of which are hereby incorporated by reference in their entirety into the present disclosure.

STATEMENT REGARDING GOVERNMENT FUNDING

This invention was made with government support under W911NF-10-2-0060 awarded by the Army Research Laboratory and under 1522954-IIS awarded by the National Science Foundation. The government has certain rights in the invention.

TECHNICAL FIELD

The present application relates to video detection systems, and more specifically, to a system for determining the locations and types of objects in a video content

BACKGROUND

Prior art video codetection systems work by selecting one out of many object proposals per image or frame that maximizes a combination of the confidence scores associated with the selected proposals and the similarity scores between proposal pairs. However, such systems typically require human pose and depth information in order to prune the search space and reduce computer processing time and increase accuracy. Further, codetection methods, whether for images or video, codetect only one common object at a time: different object classes are codetected independently. Therefore, improvements are needed in the field.

SUMMARY

According to one aspect, a method for determining the locations and types of objects in a plurality of videos is provided, comprising pairing each video with one or more sentences describing the activity or activities in which those objects participate in the associated video, wherein no use is made of a pretrained object detector. The object locations are specified as rectangles, the object types are specified as nouns, and sentences describe the relative positions and motions of the objects in the videos referred to by the nouns in the sentences. The relative positions and motions of the objects in the video are described by a conjunction of predicates constructed to represent the activity described by the sentences associated with the videos. According to certain aspects, the locations and types of the objects in the collection of videos are determined by using one or more object proposal mechanisms to propose locations for possible objects in one or more frames of the videos. In various aspects, the set of proposals is augmented by detections produced by a pretrained object detector.

BRIEF DESCRIPTION OF THE DRAWINGS

In the following description and drawings, identical reference numerals have been used, where possible, to designate identical features that are common to the drawings.

Figure 1:
FIG. 1 is a diagram showing input video frames according to various aspects.
Figure 1:
Figure 1:

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

In the system and method of the present disclosure, input video images are processed to achieve object codiscovery, defined herein as naming and localizing novel objects in a set of videos, by placing bounding boxes (rectangles) around those objects, without any pretrained object detectors. Therefore, given a set of videos that contain instances of a common object class, the system locates those instances simultaneously. The method of the present disclosure differs from most prior codetection methods in two crucial ways. First, the presently disclosed method can codetect small or medium sized objects, as well as ones that are occluded for part of the video. Second, it can codetect multiple object instances of different classes both within a single video clip and across a set of video clips.

The presently disclosed method extracts spatio-temporal constraints from sentences that describe the videos and then impose these constraints on the codiscovery process to find the collections of objects that best satisfy these constraints and that are similar within each object class. Even though the constraints implied by a single sentence are usually weak, when accumulated across a set of videos and sentences, they together will greatly prune the detection search space. This process is referred to herein as sentence directed video object codiscovery. The process produces instances of multiple object classes at a time by its very nature. The sentence we use to describe a video usually contains multiple nouns referring to multiple object instances of different classes. The sentence semantics captures the spatiotemporal relationships between these objects. As a result, the codiscovery of one object class affects that of the others and vice versa. In contrast, prior art codetection methods, whether for images or video, codetect only one common object class at a time: different object classes are codetected independently. Each time they output a single object detection of the same class for each video clip.

In general, the presently disclosed method extracts a set of predicates from each sentence and formulate each predicate around a set of primitive functions. The predicates may be verbs (e.g., CARRIED and ROTATED), spatial-relation prepositions (e.g., LEFTOF and ABOVE), motion prepositions (e.g., AWAYFROM and TOWARDS), or adverbs (e.g., QUICKLY and SLOWLY). The sentential predicates are applied to the candidate object proposals as arguments, allowing an overall predicate score to be computed that indicates how well these candidate object proposals satisfy the sentence semantics. The predicate score is added into the codiscovery framework, on top of the original similarity score, to guide the optimization.

Figure 2:
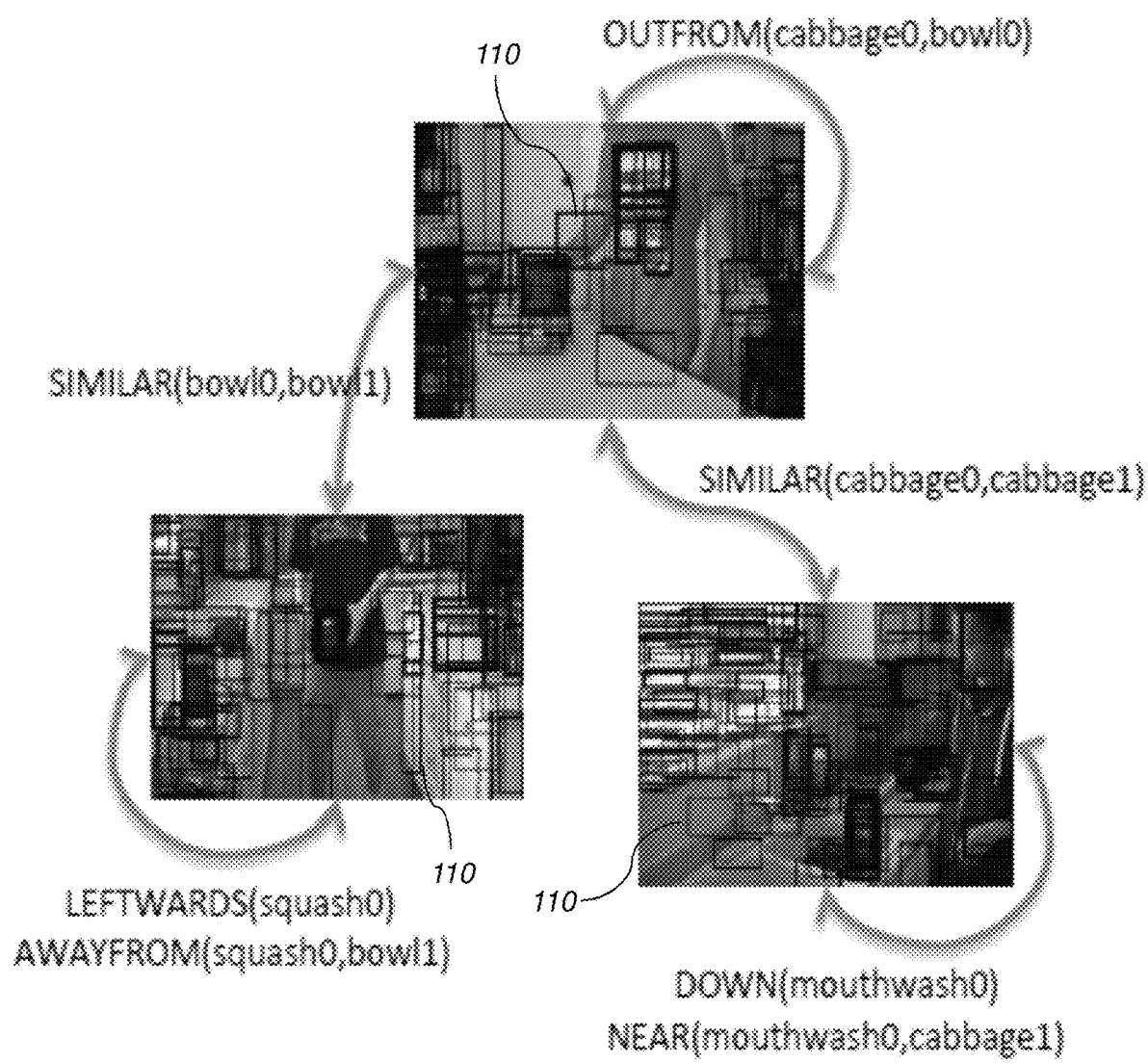
FIG. 2 is a diagram illustrating an object codetection process according to various aspects.
Figure 3:
FIG. 3 is a diagram showing output of the codetection process of FIG. 2 according to various aspects.
Figure 3:
Figure 3:

FIGS. 1-3 illustratea process for sentence directed video object codiscovery according to one embodiment. As shown in FIG. 1 ("Input"), a set of videos, which is previously paired with human-elicited sentences, one sentence per video is received as input. For each sentence, a conjunction of predicates is extracted together with the object instances as the predicate arguments. In the example illustrated in FIG. 1, we have:

| The man removed the violet cabbage from the bowl. | → | $OUTFROM(cabbage0, bowl0)$ |
| The person carried the squash to the left, away from the yellow bowl. | → | $LEFTWARDS(squash0)$ $\wedge AWAYFROM(squash0, bowl1)$ |
| The person is placing the mouthwash next to the cabbage in the sink. | → | $DOWN(mouthwash0)$ $\wedge NEAR(mouthwash0, cabbage1)$ |

The sentences in this example contain six nouns. Thus we extract six object instances: cabbage0, cabbage1, squash0, bowl0, bowl1, and mouthwash0, and produce six tracks, one track per object instance. Two tracks will be produced for each of the three video clips. To accomplish this, a collection of object-candidate generators and video-tracking methods are applied to each video to obtain a pool of object proposals. Any proposal in a video's pool is a possible object instance to assign to a noun in the sentence associated with that video. Given multiple such video-sentence pairs, a graph is formed where object instances serve as vertices and there are two kinds of edges: similarities between object instances and predicates linking object instances in a sentence. Belief Propagation is applied to this graph to jointly infer object codiscoveries by determining an assignment of proposals to each object instance. In the output as shown in FIG. 3, the red track of the first video clip is selected for cabbage0, and the blue track is selected for bowl0. The green track of the second video clip is selected for squash0, and the blue track is selected for bowl1. The red track of the third video clip is selected for cabbage1, and the yellow track is selected for mouthwash0. All six tracks are produced simultaneously in one inference run. Below, we explain the details of each component of this codiscovery framework.

The presently disclosed method exploits sentence semantics to help the codiscovery process. A conjunction of predicates is used to represent (a portion of) the semantics of a sentence. Object instances in a sentence fill the arguments of the predicates in that sentence. An object instance that fills the arguments of multiple predicates is said to be coreferenced. For a coreferenced object instance, only one track is codiscovered. For example, a sentence like "The person is placing the mouthwash next to the cabbage in the sink" implies the following conjunction of predicates:

$DOWN(mouthwash)\char`\^ NEAR(mouthwash,cabbage)$

In this case, mouthwash is coreferenced by the predicates DOWN (fills the sole argument) and NEAR (fills the first argument). Thus only one mouthwash track will be produced, simultaneously constrained by the two predicates (FIG. 3, yellow track). This coreference mechanism plays a crucial role in the codiscovery process. It tells us that there is exactly one mouthwash instance in the above sentence: the mouthwash that is being placed down is identical to the one that is placed near the cabbage. In the absence of such a coreference constraint, the only constraint between these two potentially different instances of the object class mouthwash would be that they are visually similar. Stated informally in English, this would be:

"The cabbage is near a mouthwash that is similar to another mouthwash which is placed down."

Not only does this impose an unnecessarily weaker constraint between cabbage and mouthwash, it also fails to correctly reflect the sentence semantics. To overcome this limitation, the presently disclosed method for extracting predicates from a sentence consists of two steps: parsing and ransformation/distillation. The method first uses the Stanford parser (Socher et al 2013) to parse the sentence. Next, the method employs a set of rules to transform the parsed results to ones that are 1) pertinent to visual analysis, 2) related to a prespecified set of object classes, and 3) distilled so that synonyms are mapped to a common word. These rules simply encode the syntactic variability of how objects fill arguments of predicates. They do not encode semantic information that is particular to specific video clips or datasets. For example, in the sentence "A young man put down the cup", the adjective young is not relevant to our purpose of object codiscovery and will be removed. In the sentence "The person is placing the mouthwash in the sink", the object sink is not one of the prespecified object classes. In this case, we simply ignore the extraneous objects that are out of scope. Thus for the phrase "placing the mouthwash in the sink" in the above sentence, we only extract the predicate DOWN(mouthwash). Finally, synonyms introduced by different annotators, e.g., person, man, woman, child, and adult, are all mapped to a common word (person). This mapping process also applies to other parts of speech, including verbs, prepositions, and adverbs. This transformation/distillation process never yields stronger constraint and usually yields weaker constraint than that implied by the semantics of the original sentences.

While the presently disclosed method employs a set of manually designed rules, the whole transformation/distillation process is automatic performed by the processor, which allows the system to handle sentences of similar structure with the same rule(s). To eliminate the manually designed rules, one could train a semantic parser. However, modern semantic parsers are domain specific, and no existing semantic parser has been trained on our domain. Training a new semantic parser usually requires a parallel corpus of sentences paired with intended semantic representations. Semantic parsers are trained with corpora like PropBank (Palmer et al 2005) that have tens of thousands of manually annotated sentences. Gathering such a large training corpus would be overkill for our experiments that involve only a few hundred sentences, especially since such is not our focus or contribution. Thus we employ simpler handwritten rules to automate the semantic parsing process for our corpora in this paper. Nothing, in principle, precludes using a machine-trained semantic parser in its place. However, we leave that to future work.

The predicates used to represent sentence semantics are formulated around a set of primitive functions on the arguments of the predicate. These produce scores indicating how well the arguments satisfy the constraint intended by the predicate. Table 1 defines 36 predicates used to represent sentence semantics in certain examples. Table 2 defines 12 example primitive functions used to formulate these predicates. In Table 1, the symbol p denotes an object proposal, $p^{(t)}$ denotes frame t of an object proposal, and $p^{(L)}$ and $p^{(-L)}$ denote averaging the score of a primitive function over the first and last L frames of a proposal respectively. When there is no time superscript on p, the score is averaged over all frames (e.g., BEHIND).

TABLE 2 medFIMg(p) computes the median of the average optical flow magnitude within the detections for proposal p.
$x(p^{(t)})$ returns the x-coordinate of the center of $p^{(t)}$, normalized by the frame width and height, respectively.
$y(p^{(t)})$ returns the y-coordinate of the center of $p^{(t)}$, normalized by the frame width and height, respectively.
$u(p^{(t)})$ returns a neighboring image region above $p^{(t)}$. This image region has the same size as $p^{(t)}$.
$r(p^{(t)})$ returns a ring-shape image region around $p^{(t)}$. This image region is four times the size of $p^{(t)}$.
distLessThan(x, a) is defined as $-\log(1 + \exp(-b(x - a)))$. In the experiment $b = -20$.
distGreaterThan(x, a) is defined as $-\log(1 + \exp(-b(a - x)))$.
$dist(p_1^{(t)}, p_2^{(t)})$ computes the distance between the centers of $p_1^{(t)}$ and $p_2^{(t)}$, normalized by the frame size.
$smaller(p_1^{(t)}, p_2^{(t)})$ returns 0 if the size of $p_1^{(t)}$ is smaller than that of $p_2^{(t)}$, and $-\infty$ otherwise.
tempCoher(p) evaluates whether the position of proposal p changes during the video by checking the position offsets between every pair of adjacent frames. A higher tempCoher score indicates that p is more likely to be stationary in the video.

TABLE 1

ΔDISTLARGE ≜ 0.25   ΔDISTSMALL ≜ 0.05   ΔANGLE ≜ π/2
MOVE(p) ≜ medFIMg(p)
MOVEUP(p) ≜ MOVE(p) + distLessThan($y(p^{(-L)}) - y(p^{(L)})$, −ΔDISTLARGE)
MOVEDOWN(p) ≜ MOVE(p) + distGreaterThan($y(p^{(-L)}) - y(p^{(L)})$, ΔDISTLARGE)
MOVEVERTICAL(p) ≜ MOVE(p) + distGreaterThan($|y(p^{(-L)}) - y(p^{(L)})|$, ΔDISTLARGE)
MOVELEFTWARDS(p) ≜ MOVE(p) + distLessThan($x(p^{(-L)}) - x(p^{(L)})$, −ΔDISTLARGE)
MOVERIGHTWARDS(p) ≜ MOVE(p) + distGreaterThan($x(p^{(-L)}) - x(p^{(L)})$, ΔDISTLARGE)
MOVEHORIZONTAL(p) ≜ MOVE(p) + distGreaterThan($|x(p^{(-L)}) - x(p^{(L)})|$, ΔDISTLARGE)
ROTATE(p) ≜ MOVE(p) + maxhasRotation(rotAngle($p^{(t)}$), ΔANGLE)
TOWARDS($p_1, p_2$) ≜ MOVE($p_1$) + distLessThan(dist($p_1^{(-L)}, p_2^{(-L)}$) − dist($p_1^{(L)}, p_2^{(L)}$), −ΔDISTLARGE)
AWAYFROM($p_1, p_2$) ≜ MOVE($p_1$) + distGreaterThan(dist($p_1^{(-L)}, p_2^{(-L)}$) − dist($p_1^{(L)}, p_2^{(L)}$), ΔDISTLARGE)
LEFTOFSTART($p_1, p_2$) ≜ tempCoher($p_2$) + distLessThan($x(p_1^{(L)}) - x(p_2^{(L)})$, −2ΔDISTSMALL)
LEFTOFEND($p_1, p_2$) ≜ tempCoher($p_2$) + distLessThan($x(p_1^{(-L)}) - x(p_2^{(-L)})$, −2ΔDISTSMALL)
RIGHTOFSTART($p_1, p_2$) ≜ tempCoher($p_2$) + distGreaterThan($x(p_1^{(L)}) - x(p_2^{(L)})$, 2ΔDISTSMALL)
RIGHTOFEND($p_1, p_2$) ≜ tempCoher($p_2$) + distGreaterThan($x(p_1^{(-L)}) - x(p_2^{(-L)})$, 2ΔDISTSMALL)
ONTOPOFSTART($p_1, p_2$) ≜ tempCoher($p_2$) + distGreaterThan($y(p_1^{(L)}) - y(p_2^{(L)})$, −2ΔDISTLARGE) + distLessThan($y(p_1^{(L)}) - y(p_2^{(L)})$, 0) + distLessThan($|x(p_1^{(L)}) - x(p_2^{(L)})|$, 2ΔDISTSMALL)
ONTOPOFEND($p_1, p_2$) ≜ tempCoher($p_2$)+ distGreaterThan($y(p_1^{(-L)}) - y(p_2^{(-L)})$, −2ΔDISTLARGE) + distLessThan($y(p_1^{(-L)}) - y(p_2^{(-L)})$, 0) + distLessThan($|x(p_1^{(-L)}) - x(p_2^{(-L)})|$, 2ΔDISTSMALL)
NEARSTART($p_1, p_2$) ≜ tempCoher($p_2$) + distLessThan(dist($p_1^{(-L)}, p_2^{(L)}$), 2ΔDISTSMALL)
NEAREND ($p_1, p_2$) ≜ tempCoher($p_2$) + distLessThan(dist($p_1^{(-L)}, p_2^{(-L)}$), 2ΔDISTSMALL)
INSTART($p_1, p_2$) ≜ tempCoher($p_2$) + NEARSTART($p_1, p_2$) + smaller($p_1^{(L)}, p_2^{(L)}$)
INEND($p_1, p_2$) ≜ tempCoher($p_2$) + NEAREND($p_1, p_2$) + smaller($p_1^{(-L)}, p_2^{(-L)}$)
BELOWSTART($p_1, p_2$) ≜ tempCoher($p_2$) + distGreaterThan($y(p_1^{(L)}) - y(p_2^{(L)})$, ΔDISTSMALL)
BELOWEND($p_1, p_2$) ≜ tempCoher($p_2$) + distGreaterThan($y(p_1^{(-L)}) - y(p_2^{(-L)})$, ΔDISTSMALL)
ABOVESTART($p_1, p_2$) ≜ tempCoher($p_2$) + distLessThan($y(p_1^{(L)}) - y(p_2^{(L)})$, −ΔDISTSMALL)
ABOVEEND($p_1, p_2$) ≜ tempCoher($p_2$) + distLessThan($y(p_1^{(-L)}) - y(p_2^{(-L)})$, −ΔDISTSMALL)

$$OVER(p_1, p_2) \triangleq tempCoher(p_2) + \max_t \begin{pmatrix} distLessThan(y(p_1^{(t)}) - y(p_2^{(t)}), -\Delta distSmall) + \\ distSmallThan(|x(p_1^{(t)}) - x(p_2^{(t)})|, \Delta distLarge) \end{pmatrix}$$

ABOVEMOVE(p) ≜ tempCoher(p) + MOVE(u(p))
AROUNDMOVE(p) ≜ tempCoher(p) + MOVE(r(p))
INMOVE(p) ≜ tempCoher(p) + MOVE(p)

$$TOUCHHAND(p) \triangleq \max_t distLessThan(dist(p^{(t)} - h^{(t)}), \Delta DISTSMALL)$$

$$NEARHAND(p) \triangleq \min_t distLessThan(dist(p^{(t)} - h^{(t)}), \Delta DISTSMALL)$$

$$BELOWHAND(p) \triangleq \min_t distGreaterThan(y(p^{(t)}) - y(h^{(t)}), 0).$$

APPROACHHAND(p) ≜ TOUCHHAND(p) + distLessThan(dist($p^{(-L)} - h^{(-L)}$) − dist($p^{(L)} - h^{(L)}$), −ΔDISTLARGE)
BEHIND($p_1, p_2$) ≜ tempCoher($p_2$) + distLessThan ($y(p_1) - y(p_2)$, −2ΔDISTSMALL)
FRONTOF($p_1, p_2$) ≜ tempCoher($p_2$) + distGreaterThan ($y(p_1) - y(p_2)$, 2ΔDISTSMALL)
LEFTOF($p_1, p_2$) ≜ tempCoher($p_2$) + distLessThan ($x(p_1) - x(p_2)$, −2ΔDISTSMALL)
RIGHTOF($p_1, p_2$) ≜ tempCoher($p_2$) +distGreaterThan ($x(p_1) - x(p_2)$, 2ΔDISTSMALL)

TABLE 2-continued rotAngle(p$^{(t)}$) computes the current rotation angle of the object inside p$^{(t)}$ by comparing its current orientation with its orientation 1 second (30 frames) earlier in the video. This is computed by extracting SIFT features (Lowe 2004) for both p$^{(t)}$ and p$^{(t-30)}$ and matching them to estimate the similarity transformation matrix, from which the rotation angle can be computed.
hasRotation($\alpha$, $\beta$) computes the log likelihood of the rotation angle $\alpha$ with the von Mises distribution $$f(x\mid\mu,\kappa) = \frac{e^{\kappa\cos(x-\mu)}}{2\pi I_0(\kappa)}$$

taking $\mu = \beta$. In the experiment, the concentration $\kappa = 4$.

While the predicates of the presently disclosed system and method are manually designed, they are straightforward to design and code. The effort to do so (several hundred lines of code) could be even less than that of designing a machine learning model that handles the three datasets in our experiments. The reason why this is the case is that the predicates encode only weak constraints. Each predicate uses at most four primitive functions (most use only two). The primitive functions are simple, e.g., the temporal coherence (tempCoher) of an object proposal, the average flow magnitude (medFlMg) of a proposal, or simple spatial relations like distLessThan/distGreaterThan between proposals. Unlike features used to support activity recognition or video captioning, these primitive functions need not accurately reflect every nuance of motion and changing spatial relations between objects in the video that is implied by the sentence semantics. They need only reflect a weak but sufficient level of the sentence semantics to help guide the search for a reasonable assignment of proposals to nouns during codiscovery. Because of this important property, these primitive functions are not as highly engineered as they might appear to be. The predicates of the presently disclosed method are general in nature and not specific to specific video samples or datasets.

To generate object proposals, the system first generates N object candidates for each video frame and construct proposals from these candidates. To support codiscovery of multiple stationary and moving objects, some of which might not be salient and some of which might be occluded for part of the video, the presently disclosed method for generating object candidates must be general purpose: it cannot make assumptions about the video (e.g., simple background) or exhibit bias towards a specific category of objects (e.g., moving objects). Thus methods that depend on object salience or motion analysis would not be suitable with the presently disclosed method. The presently disclosed method uses EdgeBoxes (Zitnick and Dollar 2014) to obtain the N/2 top-ranking object candidates and MCG (Arbelaez et al 2014) to obtain the other half, filtering out candidates larger than 1/20 of the videoframe size to focus on small and medium-sized objects. This yields NT object candidates for a video with T frames. The system then generatse K object proposals from these NT candidates. To obtain object proposals with object candidates of consistent appearance and spatial location, one would nominally require that K<<N$^T$. To circumvent this, the system first randomly samples a frame t from the video with probability proportional to the average magnitude of optical flow (Farneback 2003) within that frame. Then, the system samples an object candidate from the N candidates in frame t. To decide whether the object is moving or not, the system samples from {MOVING, STATIONARY} with distribution {1/3, 2/3}. The system samples a MOVING object candidate with probability proportional to the average flow magnitude within the candidate. Similarly, the system samples a STATIONARY object candidate with probability inversely proportional to the average flow magnitude within the candidate. The sampled candidate is then propagated (tracked) bidirectionally to the start and the end of the video. We use the CamShift algorithm (Bradski 1998) to track both MOVING and STATIONARY objects, allowing the size of MOVING objects to change during the process, but requiring the size of STATIONARY objects to remain constant. STATIONARY objects are tracked to account for noise or occlusion that manifests as small motion or change in size. The system tracks STATIONARY objects in RGB color space and MOVING objects in HSV color space. Generally, RGB space is preferable to HSV space because HSV space is noisy for objects with low saturation (e.g., white, gray, or dark) where the hue ceases to differentiate. However, HSV space is used for MOVING objects as it is more robust to motion blur. RGB space is used for STATIONARY objects because motion blur does not arise. The system preferably does not use optical-flow-based tracking methods since these methods suffer from drift when objects move quickly. The system repeats this sampling and propagation process K times to obtain K object proposals $\{p_k\}$ for each video. Examples of the sampled proposals (K=240) are shown as black boxes (rectangles) 110 in FIG. 2.

To compute the similarity of two object proposals, the system implements the method as follows. The system first uniformly sample M boxes (rectangles) $\{b^m\}$ from each proposal p along its temporal extent. For each sampled box (rectangle), the system extracts PHOW (Bosch et al 2007) and HOG (Dalai and Triggs 2005) features to represent its appearance and shape. The system also does so after rotating this detection by 90 degrees, 180 degrees, and 270 degrees. Then, the system measures the similarity g between a pair of detections $b^m_1$ and $b^m_2$ with:

$$g(b^m_1, b^m_2) = \max_{i,j\in\{0,1,2,3\}} \frac{1}{2}\left(\begin{array}{c} g_\chi 2(rot_i(b^m_1), rot_j(b^m_2)) \\ +g_{L_2}(rot_i(b^m_1), rot_j(b^m_2)) \end{array}\right)$$

where $rot_i$ i=0, 1, 2, 3 represents rotation by 0 degrees 90 degrees 180 degrees and 270 degrees respectively. The system uses $g_\chi^2$ to compute the $x^2$ distance between the PHOW features and $g_{L2}$ to compute the Euclidean distance between the HOG features, after which the distances are linearly scaled to [0,1] and converted to log similarity scores. Finally, the similarity between two proposals $p_1$ and $p_2$ is taken to be:

$$g(p_1, p_2) = \mathrm{median}_m\, g(b^m_1, b^m_2)$$

The system extracts object instances from the sentences and model them as vertices in a graph. Each vertex v can be assigned one of the K proposals in the video that is paired with the sentence in which the vertex occurs. The score of assigning a proposal $k_v$ to a vertex v is taken to be the unary predicate score $h_v(k_v)$ computed from the sentence (if such exists, or otherwise 0). The system constructs an edge between every two vertices u and v that belong to the same object class. This class membership relation is denoted as (u, v)∈ ℰ. The score of this edge (u,v), when the proposal $k_u$ is assigned to vertex u and the proposal $k_v$ is assigned to vertex v, is taken to be the similarity score $g_{u,v}(k_u,k_v)$ between the two proposals. Similarly, the system also constructs an edge between two vertices u and v that are arguments of the same binary predicate. This predicate membership relation is denoted as $(u, v) \in \mathcal{P}$. The score of this edge (u,v), when the proposal $k_u$ is assigned to vertex u and the proposal $k_v$ is assigned to vertex v, is taken to be the binary predicate score $h_{u,v}(k_u,k_v)$ between the two proposals. The problem, then, is to select a proposal for each vertex that maximizes the joint score on this graph, i.e., solving the following optimization problem for a CRF:

$$\max_k \sum_v h_v(k_v) + \sum g_{u,v}(k_u, k_v) + \sum h_{u,v}(k_u, k_v) \quad (1)$$

where k is the collection of the selected proposals for all the vertices. This discrete inference problem can be solved approximately by Belief Propagation (Pearl 1982).

Conceptually, this joint inference does not require sentences for every video clip. In such a case where some video clips are not described with sentences, the system output would only have the similarity score g in Eq. 1 for these clips, and would have both the similarity and predicate scores for the rest. This flexibility allows the presently disclosed method to work with videos that do not exhibit apparent semantics or exhibit semantics that can only be captured by extremely complicated predicates or models. Furthermore, the semantic factors h may cooperate with other forms of constraint or knowledge, such as the pose information, by having additional factors in the CRF to encode such constraint or knowledge. This would further boost the performance of object codiscovery implemented by the disclosed system.

Figure 4:
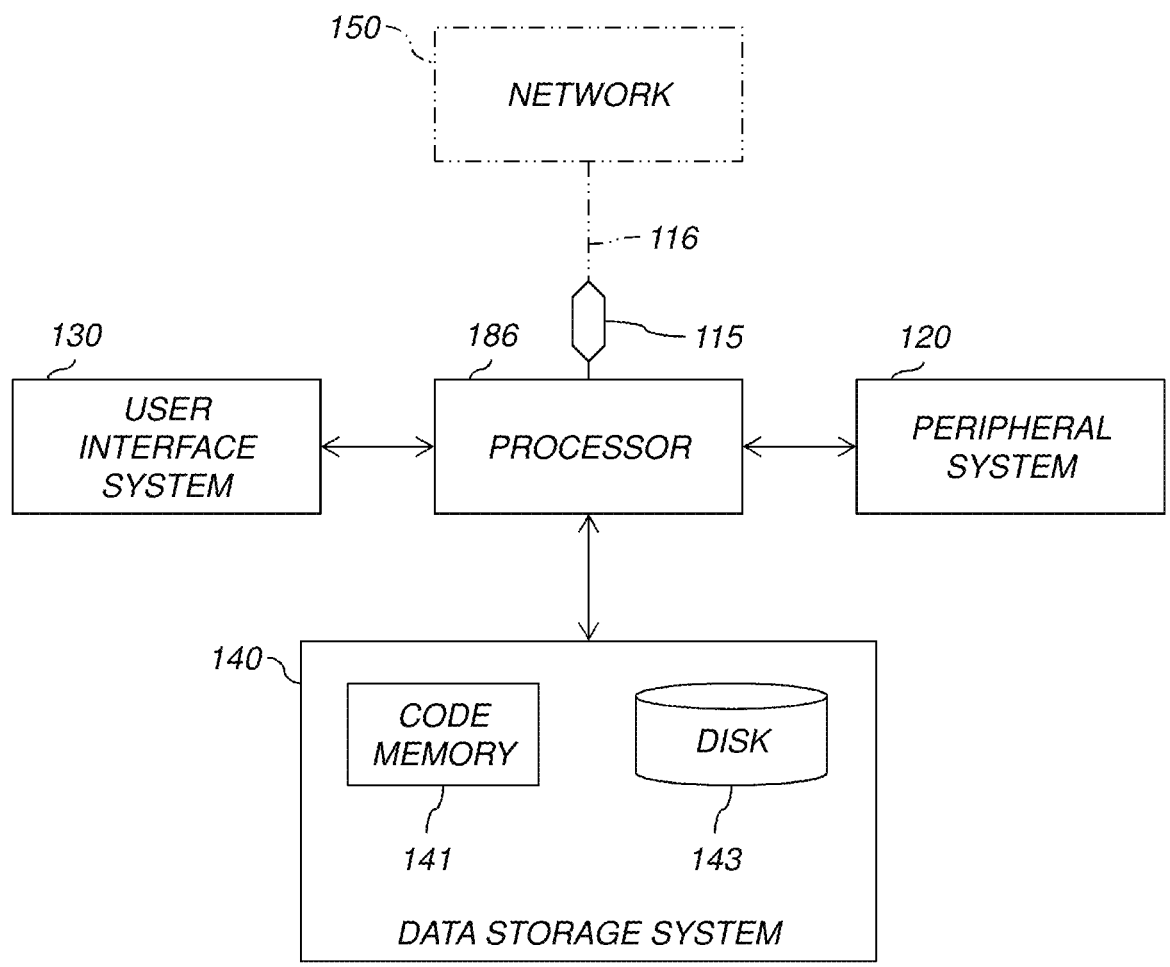
FIG. 4 is a diagram showing a system for performing the method of FIGS. 1-3 according to various aspects.

FIG. 4 is a high-level diagram showing the components of an exemplary data-processing system for analyzing data and performing other analyses described herein, and related components. The system includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom), e.g., the Internet or a leased line, as discussed below. It shall be understood that the system 120 may include multiple processors 186 and other components shown in FIG. 4. The video content data, and other input and output data described herein may be obtained using network 150 (from one or more data sources), peripheral system 120 and/or displayed using display units (included in user interface system 130) which can each include one or more of systems 186, 120, 130, 140, and can each connect to one or more network(s) 150. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 186 can implement processes of various aspects described herein. Processor 186 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the data processing system 186 but can be stored completely or partially within the data processing system 186.

The peripheral system 120 can include one or more devices configured to provide information to the processor 186. For example, the peripheral system 120 can include electronic or biological sensing equipment, such as magnetic resonance imaging (MRI) scanners, computer tomography (CT) scanners, and the like. The processor 186, upon receipt of information from a device in the peripheral system 120, can store such information in the data storage system 140.

The user interface system 130 can include a mouse, a keyboard, another computer (connected, e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 115 sends and receives electrical, electromagnetic or optical signals that carry digital or analog data streams representing various types of information across network link 116 to network 150. Network link 116 can be connected to network 150 via a switch, gateway, hub, router, or other networking device.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 120), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143, e.g., a tangible computer-readable rotational storage device such as a hard drive. Computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of the flowchart illustrations or block diagrams herein, and combinations of those, can be implemented by computer program instructions. Code memory 141 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 186 (and possibly also other processors), to cause functions, acts, or operational steps of various aspects herein to be performed by the processor 186 (or other processor). Computer program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method for determining the locations and types of objects in a plurality of videos, comprising:
   using a computer processor, receiving a plurality of videos;
   pairing each of the videos with one or more sentences;
   using the processor, determining the locations and types of the objects in the plurality of videos by:
   a. using one or more object proposal mechanisms to propose locations for possible objects in one or more frames of the videos;
   b. using one or more object trackers to track the positions of the proposed object locations forward or backward in time;
   c. collecting the tracked proposal positions for each proposal into a tube, wherein a tube is a collection of tracked proposal positions; and
   d. computing features for tracked proposal positions of a plurality of tubes,
   wherein no use is made of a pretrained object detector.

2. The method of claim 1, wherein locations of the objects are specified by the processor as rectangles in frames of the videos, the object types are specified as nouns, and the one or more sentences describe the relative positions and motions of the objects in the videos referred to by the nouns in the one or more sentences.

3. The method of claim 1, wherein the relative positions and motions of the objects in the video are described by a conjunction of logical predicates constructed to represent the activity described by the sentences associated with the videos.

4. The method of claim 1, wherein a proposal generation mechanism is MCG.

5. The method of claim 1, wherein a proposal generation mechanism is EdgeBoxes.

6. The method of claim 1, wherein the proposals are tracked by CamShift.

7. The method of claim 1, wherein moving proposals are tracked in HSV color space and allowed to change size.

8. The method of claim 1, wherein stationary proposals are tracked in RGB color space and are required to remain of constant size.

9. The method of claim 1, wherein PHOW features are used as image/tube features.

10. The method of claim 1, wherein HOG features are used as image/tube features.

11. The method of claim 1, wherein similarity is measured using a chi-squared distance between image/tube features.

12. The method of claim 1, wherein similarity is measured using Euclidean distance between image/tube features.

13. The method of claim 1, wherein the set of proposal is augmented with proposals rotated by multiples of 90 degrees.

14. The method of claim 1, wherein the similarity measures and predicate scores are combined by summation.

15. The method of claim 1, wherein the graph model is solved using Belief Propagation.

16. The method of claim 1, wherein the set of proposals is augmented by detections produced by a trained object detector.

17. The method of claim 1, wherein determining the locations and types of the objects in the plurality of videos further comprises:
   a. forming a graph model, wherein:
      i. one or more noun occurrences in sentences associated with a video are associated with vertices in the model;

ii. a set of potential labels of each vertex is the set of proposal tubes for the associated video; or
iii. pairs of vertices that are associated with occurrences of the same noun in two sentences associated with different videos are attached by a binary predicate computed as a similarity measure between the tubes selected from label sets for the two vertices.

\* \* \* \* \*